United States Patent [19]

Nyman et al.

[11] 4,383,961
[45] May 17, 1983

[54] DRYING PROCESS FOR VIDEO DISCS

[75] Inventors: Frederick R. Nyman, Carmel; Barry Stevens, Indianapolis, both of Ind.; Lincoln Ekstrom, Princeton, N.J.

[73] Assignee: RCA Corporation, New York, N.Y.

[21] Appl. No.: 165,977

[22] Filed: Jul. 7, 1980

[51] Int. Cl.³ .............................................. B29D 17/00
[52] U.S. Cl. .................................. 264/107; 264/233; 425/810; 134/199
[58] Field of Search ...................... 264/107, 233, 344; 134/199; 425/810

[56] References Cited

U.S. PATENT DOCUMENTS

| | | | |
|---|---|---|---|
| 2,663,050 | 12/1953 | Helm | 264/233 X |
| 3,479,222 | 11/1969 | David | 134/199 X |
| 3,842,194 | 10/1974 | Clemens | 178/6.6 A |
| 3,981,947 | 9/1976 | Kaufman | 264/36 |
| 4,202,071 | 5/1980 | Scharpf | 134/199 X |
| 4,275,100 | 6/1981 | Datta | 264/344 X |

FOREIGN PATENT DOCUMENTS

| | | |
|---|---|---|
| 1168710 | 10/1969 | United Kingdom . |
| 1226720 | 3/1971 | United Kingdom . |
| 1236180 | 6/1971 | United Kingdom . |
| 1428530 | 3/1976 | United Kingdom . |
| 1440705 | 6/1976 | United Kingdom . |
| 1492780 | 11/1977 | United Kingdom . |
| 1530070 | 10/1978 | United Kingdom . |
| 1556291 | 11/1979 | United Kingdom . |

Primary Examiner—Thomas P. Pavelko
Attorney, Agent, or Firm—B. E. Morris; R. Hain Swope

[57] ABSTRACT

Video discs are dried by first spraying the surface with liquid fluorocarbon to remove water and heating the disc so as to prevent water condensation during evaporation of the fluorocarbon, preferably in a fluorocarbon vapor.

5 Claims, 2 Drawing Figures

DRYING PROCESS FOR VIDEO DISCS

This invention relates to a method for manufacturing high density information discs. More particularly, this invention relates to a process for drying information discs that have been treated with water or aqueous solutions.

BACKGROUND OF THE INVENTION

Huck et al, in copending application, Ser. No. 091,878 filed Nov. 7, 1979 and herein incorporated by reference, have disclosed that high density information discs made from heavily plasticized conductive carbon loaded plastics must be treated by washing the surface with an aqueous solution to remove salts and hydroscopic materials which bleed to the surface of the discs during molding and interfere with playback. The discs are treated and rinsed with water or an aqueous solution and air dried.

In a mass production environment, single disc operations to remove water droplets that may cling to the surface of the disc are unacceptable because they are slow and expensive and they may damage the disc surface. Air drying has the disadvantage that it takes too long and can leave residues on the disc surface. Heating the disc at elevated temperatures to drive off the residual surface water is also unacceptable because the temperatures required would warp, shrink or otherwise distort the physical parameters of the plastic disc which in turn would lead to distortion of the very small information patterns on the disc. Further, any residues would be dried onto or baked into the surface of the disc.

Thus a method of drying the discs was sought that would be effective, uniform, rapid, be able to handle multiple discs simultaneously and be subject to automation, and have no adverse effect on the disc surface or physical dimensions, be inert with respect to the disc materials, and leave no residue on the surface of the disc.

SUMMARY OF THE INVENTION

We have found that moisture on the surface of high density information conductive plastic discs can be removed by first spraying the disc surface with a high boiling point fluorocarbon liquid to mechanically remove material from the surface and then maintaining the disc in the fluorocarbon vapor to bring it to thermal equilibrium and prevent subsequent moisture condensation on the disc surface.

DETAILED DESCRIPTION OF THE INVENTION

The high density information discs of the present invention have been described in detail by Clemens et al, U.S. Pat. No. 3,842,194. The present post molding treatment of the disc includes an aqueous rinse to remove salts and other debris from the surface of the disc after molding that can interfere with playback and cause moisture sensitivity of the disc surface, and the drying step described herein. A final step to apply a thin layer of lubricant to the disc surface is carried out after the present drying process.

The present drying process requires two steps; a first spray rinse of the disc surface to physically remove water and a heated vapor treatment to prevent later moisture condensation on the surface of the disc. This process will be further explained by reference to the drawings.

Figure 1:
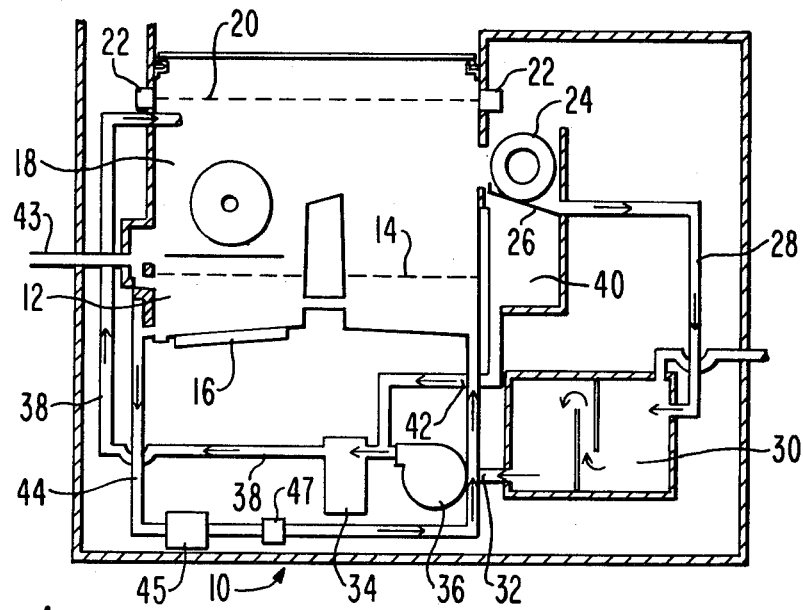
FIG. 1 is an elevational view of an apparatus in which to carry out the present drying process.

FIG. 1 shows a schematic illustration of an apparatus in which to carry out the present drying process.

A container 10 is fitted with a series of compartments as further explained below and suitable piping for transferring liquids from one compartment to another.

A fluorocarbon liquid is maintained in a first compartment 12 to a predetermined liquid zone 14. Heaters 16 heat the fluorocarbon so as to maintain a layer of fluorocarbon vapor 18 above the liquid zone 14, also to a predetermined vapor zone level 20. The top of the vapor zone 20 is determined by a cooling control jacket 22. The cooling control jacket 22 condenses the fluorocarbon vapor that would otherwise escape into the atmosphere and returns it to the container 10.

The fluorocarbon vapor in the vapor layer 18 is condensed by means of condensing coils 24 to liquify it. The condensed fluorocarbon is carried by means of collection trough 26 to a collection pipe 28 into a water separating compartment 30. In the water separating compartment 30, water and the fluorocarbon are separated out. The fluorocarbon is collected and carried through a pipe 32 to a series of mesh filters 34, which remove particulates, using a pump 36. A carbon filter to remove other contaminants can also be included. The fluorocarbon is then recycled by means of solvent line 38 to the spray heads shown in further detail in FIG. 2.

Liquid fluorocarbon from the first compartment 12 is also recycled and purified by overflowing after spraying into a reservoir 40 from which it is carried by means of a collection pipe 42 through the filters 34.

The liquid fluorocarbon which has been used to spray the discs also falls into the first compartment 12. This fluorocarbon contains water which collects on top of the fluorocarbon liquid and is drawn off by means of a pipe 43. The liquid fluorocarbon is recycled by flowing into pipe 44 where it is passed by means of a pump 45 through a carbon filter 47 back to the compartment 12. Thus water and organic impurities are removed from the liquid fluorocarbon on a continuous basis.

Although the process has been described as being carried out in a single container, a series of containers can be used or a single continuous container can be employed to carry out the present process, as will be known to those skilled in the art.

Figure 2:
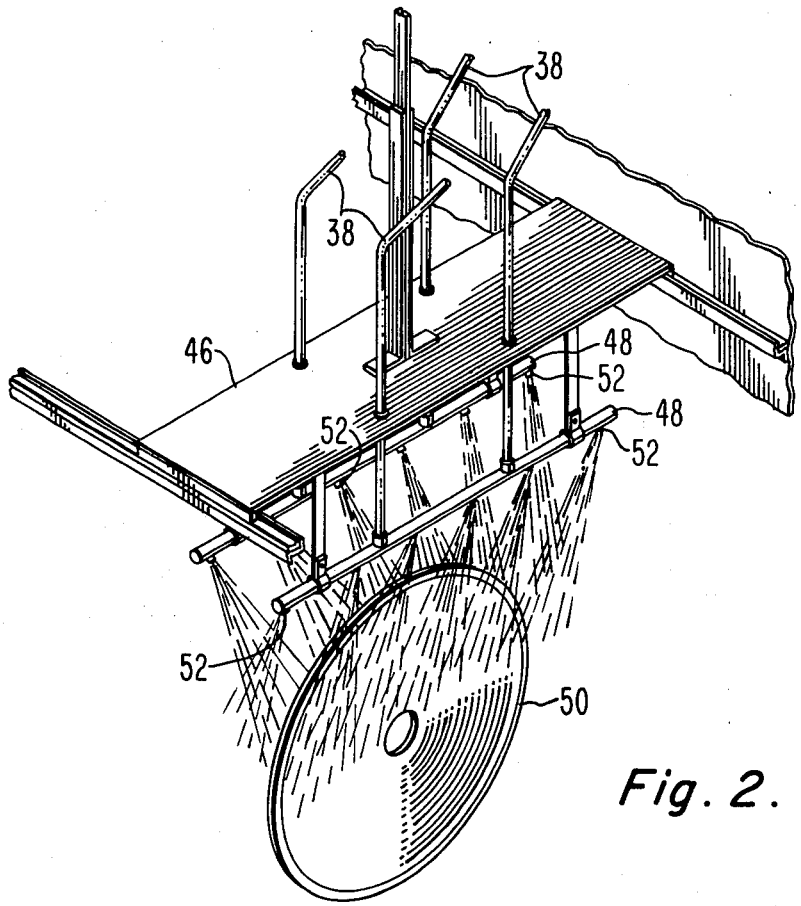
FIG. 2 is a perspective view of a suitable nozzle arrangement for spraying the disc surface.

As shown in FIG. 2 a rack 46 holds a series of spray heads further described below which rinse the surface of a suspended disc 50 with liquid fluorocarbon. After rinsing, the spray is turned off or the disc is transferred to a vapor laden area where the disc 50 is allowed to remain in a vapor zone 18 to complete the drying process.

FIG. 2 shows a perspective view of the rack 46 and solvent pipes 38 which deliver liquid fluorocarbon to the spray heads 48. The information disc 50 is suspended between the spray heads 48 by means of a suitable holder (not shown). The spray heads 48 contain a series of nozzles 52 which are arranged so that the fluorocarbon liquid delivered by the nozzles 52 is directed along the upper surface of the disc 50 and directed against each side of the disc 50 so as to result in a scrubbing action by the liquid fluorocarbon along the surface of the disc.

The fluorocarbon preferred at the present time is 1,1,2-trichloro-2,2,1-trifluoroethane. This fluorocarbon is commercially available from several sources in pure form, e.g., less than a few parts per million of impurities, and has a boiling point of about 117.6° F. (46° C.), well above normal ambient temperatures but well below the heat distortion temperature of the conductive plastic material of the disc, which is desirably about 70° C. (158° F.).

It may be desirable to add a small amount of a surface active agent to the fluorocarbon liquid to improve wetting and the dislodging effect of water by the fluorocarbon. Surface active agents are well known and amine phosphates are compatible with fluorocarbons for example. However, for the present application, since the surfactant in turn may remain on the disc after evaporation of the fluorocarbon and if used in undue amounts an additional rinse would be required with pure fluorocarbon to remove it, the presence of a surfactant or other additive to the fluorocarbon except in minor amounts, is not preferred at this time.

The two-step fluorocarbon treatment is essential to remove residual water from the surface of the disc and to prevent recondensation of moisture onto the disc surface after washing.

The fluorocarbon which is essentially free of water, e.g., contains 35 ppm or less of water, is sprayed onto the surface of the disc with sufficient force so as to remove water in the form of droplets or a layer from the disc surface by a mechanical scrubbing action. This mechanical action replaces all of the water on the disc surface with a layer of fluorocarbon. For example, a spray flow of about 1 gallon per minute (3.8 liters per minute) from at least two spray heads, each having at least four nozzles under a liquid pressure of about 15-17 psi (1.05-1.19 kg/cm$^2$) for about 2-3 minutes at a temperature of about 100° F. (38.9° C.) is adequate to remove all water from a disc completely saturated with water (about 1 milliliter per side).

The disc is then maintained in a vapor of fluorocarbon until it is stabilized, i.e., it is heated to the temperature of the fluorocarbon vapor, to prevent a cooling effect and recondensation of water onto the disc surface as the fluorocarbon evaporates. A 1-2 minute vapor treatment is generally sufficient.

Exposing the disc surface to fluorocarbon vapor alone is ineffective to remove all surface moisture because only about 20 percent of the water on the disc is replaced by fluorocarbon, even after long periods of vapor exposure time, up to one half hour or longer. Some type of mechanical action is required to dislodge the water from the highly irregular surface of the disc.

Exposing the disc surface to liquid fluorocarbon alone is also ineffective because of the large cooling effect as liquid fluorocarbon evaporates from the surface of the disc. As the fluorocarbon evaporates in air, it chills the surface of the disc substantially below ambient temperatures, whereupon water from the atmosphere condenses on the surface, wetting it again.

Fluorocarbons are very volatile and evaporate from the surface of the disc rapidly and completely even at ambient temperatures. This rapid evaporation is so fast that water can even condense on the surface of the disc as ice crystals. Thus heating the disc surface is important so that the disc remains at or above room temperature during the evaporation of the fluorcarbon. Essentially no fluorocarbon remains on the surface of the disc after one minute exposure to fluorocarbon vapor.

Thus the present process requires first a liquid spray of the disc surface to remove the water, and then a high temperture vapor exposure to heat the disc so that it remains at an elevated temperature during fluorocarbon evaporation, preventing water condensation on the disc surface during the evaporation. Preferably a fluorocarbon environment is maintained above the liquid fluorocarbon spray tank to ensure that the liquid fluorocarbon does not get contaminated with large amounts of water from the atmosphere, again due to the cooling effect on the liquid surface due to rapid evaporation of the fluorocarbon. In any event, provision must be made to constantly remove water from the fluorocarbon liquid and vapor. The apparatus described in FIG. 1 above exemplifies a suitable arrangement.

The fluorocarbon employed in the present process must be kept essentially free of dissolved water, e.g., on the order of 40 ppm of water or less, and free of particulate matter that could damage the disc surface during the spraying step. Other impurities such as acids or alkali hydroxides that could react with the disc surface must also be removed on a continuous basis. A continuous distillation of the fluorocarbon and filtration of the boiling fluorocarbon liquid to be purified, as described above, are ways to achieve this, but filtration and chemical treatment of the fluorocarbon can also be employed.

In the presence of chemical drying as described above, water from the aqueous rinse step tends to cling to the surface of the disc, particularly at the center hole edges and around the periphery of the disc but also in the information areas. This in itself would not ordinarily interfere with playback; however, the moisture present on the disc can be transferred to the playback area during handling and packaging, leaving water droplets on the playback area. On storage, these water droplets can leach out salts from the disc material, can attract dust and particulate matter from the air, and leave water spots on the disc surface on evaporation, thus causing carrier distress or lack of signal during playback. In the absence of chemical rinsing, about 16 percent of discs had unacceptably high carrier distress or tracking problems, indicating the formation of debris on the disc surface which causes the playback stylus to be lifted out of its groove. The fluorocarbon water removal treatment of the present invention has improved the overall yield of video discs to about 95 percent.

Although the present process has been described as being carried out in a single container for liquid and vapor fluorocarbon treatment, a series of containers for liquid and for vapor treatment of the discs can also be employed, as will be apparent to one skilled in the art. The invention is independent of the apparatus in which the two-step drying treatment is carried out.

We claim:

1. In a process of manufacturing high density information discs which comprises compression molding the discs and removing surface contaminants by means of an aqueous rinse step, the improvement consisting essentially of drying the surface of the discs by first removing surface moisture with a liquid fluorocarbon spray which mechanically scrubs the disc surface to remove water droplets, maintaining the disc in fluorocarbon vapor until the disc temperature reaches the vapor temperature, and thereafter removing the discs from the vapor thereby preventing recondensation of moisture on the disc surface.

2. The process according to claim 1 in which the fluorocarbon is 1,1,2-trichloro-2,2,1-trifluoroethane.

3. A process according to claim 1 wherein said disc is made of a plasticized conductive carbon containing polyvinylchloride composition.

4. In the process of fabricating a video disc replica which comprises dry blending a polyvinylchloride resin with additives including stabilizers, lubricants and flow modififers, compression molding to form a video disc replica and applying a thin lubricant layer to the disc surface, wherein the disc replica is cleaned with a water based solution to remove water soluble salts from the surface prior to application of said lubricant, the improvement consisting essentially of substituting a layer of fluorocarbon for said water-based cleaning solution on the surface of the disc by exposing the disc to a spray of the fluorocarbon liquid and heating the disc in vapor of the fluorocarbon while evaporating the liquid fluorocarbon therefrom, and thereafter removing the disc from said vapor thereby preventing recondensation of water on the disc surface.

5. A process according to claim 4 wherein said fluorocarbon is 1,1,2-trichloro-2,2,1-trifluoroethane.

* * * * *